(12) United States Patent
Takinami et al.

(10) Patent No.: US 11,443,534 B2
(45) Date of Patent: Sep. 13, 2022

(54) VEHICULAR MONITORING DEVICE

(71) Applicant: ISUZU MOTORS LIMITED, Tokyo (JP)

(72) Inventors: Shigeru Takinami, Fujisawa (JP); Kazuhiko Yamaguchi, Fujisawa (JP); Mayumi Iwao, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 17/278,077

(22) PCT Filed: Sep. 20, 2019

(86) PCT No.: PCT/JP2019/036878
§ 371 (c)(1),
(2) Date: Mar. 19, 2021

(87) PCT Pub. No.: WO2020/059835
PCT Pub. Date: Mar. 26, 2020

(65) Prior Publication Data
US 2021/0350155 A1    Nov. 11, 2021

(30) Foreign Application Priority Data

Sep. 20, 2018    (JP) .............................. JP2018-176321

(51) Int. Cl.
*G08G 1/056*    (2006.01)
*G06V 20/59*    (2022.01)
(Continued)

(52) U.S. Cl.
CPC ............. *G06V 20/597* (2022.01); *B60Q 9/00* (2013.01); *G06K 9/6298* (2013.01); *G06V 10/758* (2022.01)

(58) Field of Classification Search
USPC ........ 340/935, 936–939, 967, 969, 427–429, 340/426.22, 435, 438, 459, 472, 488, 517
See application file for complete search history.

(56) References Cited

U.S. PATENT DOCUMENTS 6,920,234 B1 * 7/2005 Koenig ............ G08B 13/19645
382/103
2009/0268022 A1 * 10/2009 Omi ........................ A61B 5/18
348/135

(Continued)

FOREIGN PATENT DOCUMENTS

CN    101032405 A    9/2007
CN    105740847 A    7/2016

(Continued)

OTHER PUBLICATIONS

International Search Report and Written Opinion for related PCT App No. PCT/JP2019/036878 dated Nov. 12, 2019, 10 pgs. (partial translation).

(Continued)

*Primary Examiner* — Daniel Previl
(74) *Attorney, Agent, or Firm* — Procopio, Cory, Hargreaves & Savitch LLP (57) ABSTRACT

In this vehicular monitoring device, an imaging unit 2 captures an image of the driver of a vehicle. A driving state measurement unit 70 analyzes the image captured by the imaging unit 2 and measures a plurality of driving states including the eye opening degree of the driver. A travel state determination unit 71 determines the travel state of the vehicle. An alarm determination unit 72 uses the driving states and the travel state as a basis to determine whether to activate an alarm device 5. When a statistical amount calculated from time series data for the eye opening degree acquired from the driving state measurement unit 70 is outside of a predetermined normal determination reference (Continued)

range, the driving states other than the eye opening degree are normal, and the travel state is determined to be normal, the alarm determination unit 72 causes the driving state measurement unit 70 to perform eye opening degree detection processing again.

7 Claims, 7 Drawing Sheets

(51) Int. Cl.
*B60Q 9/00* (2006.01)
*G06K 9/62* (2022.01)
*G06V 10/75* (2022.01)

(56) References Cited

U.S. PATENT DOCUMENTS

| | | | |
|---|---|---|---|
| 2011/0205350 A1* | 8/2011 | Terashima | G08B 21/06 348/78 |
| 2016/0171321 A1* | 6/2016 | Ohsuga | A61B 5/168 345/419 |
| 2020/0079366 A1* | 3/2020 | Higashitani | B60R 16/03 |
| 2020/0247422 A1* | 8/2020 | Yoshida | A61M 21/00 |

FOREIGN PATENT DOCUMENTS

| | | |
|---|---|---|
| JP | 2001225666 A | 8/2001 |
| JP | 2002087107 A | 3/2002 |
| JP | 2003118424 A | 4/2003 |
| JP | 2006251926 A | 9/2006 |
| JP | 2008-165348 A | 7/2008 |
| JP | 2010067137 A | 3/2010 |
| JP | 2011-043961 A | 3/2011 |
| JP | 2016115120 A | 6/2016 |
| JP | 2016209231 A | 12/2016 |
| JP | 2017004389 A | 1/2017 |

OTHER PUBLICATIONS

The State Intellectual Property of People's Republic of China, The First Office Action, Application No. CN 201980061810.9, dated Jun. 2, 2022, in 17 pages.

* cited by examiner

//VEHICULAR MONITORING DEVICE

CROSS-REFERENCE TO RELATED APPLICATIONS

This application is a U.S. National Stage entry of PCT Application No: PCT/JP2019/036878 filed Sep. 20, 2019, which claims priority to Japanese Patent Application No. 2018-176321 filed Sep. 20, 2018, the contents of which are incorporated herein by reference.

TECHNICAL FIELD

The present invention relates to a monitoring device, and more particularly, to a device mounted on a vehicle for monitoring a driver of the vehicle.

BACKGROUND ART

In recent years, various techniques for estimating the awakening state of a driver and generating an alarm as needed have been proposed (for example, Patent Literature 1). In Patent Literature 1, a technique for tracking a time-series trend of the width of eye opening measured by a width of eye opening measurement means and determining an open-eye threshold value by filtering the measured value with a low frequency filtration filter is disclosed.

CITATION LIST

Patent Literature

Patent Literature 1: JP-A-2010-067137

SUMMARY OF INVENTION

Technical Problem

In the technology described above, when it is determined that an alarm should be output, the driver is notified of the alarm. The alarm is to call the attention of the driver. Therefore, sound or vibration is presented to the driver, or a message is presented on a display unit in order to prompt the driver who is driving the vehicle to wake up.

It is useful to be notified of these alarms when the driver needs to be alerted. However, if an alarm is notified due to an erroneous determination when there is no need to call attention, the concentration of the driver driving the vehicle may be disturbed.

The present invention has been made in view of these points, and an object of the present invention is to provide a technique for suppressing an erroneous determination regarding the driving state.

Solution to Problem

The first aspect of the present invention is a vehicular monitoring device. This device may include an imaging unit which captures an image of a driver of a vehicle, a driving state measurement unit which analyzes the image captured by the imaging unit and measures a plurality of driving states including an eye opening degree of the driver, a traveling state determination unit which determines a traveling state of the vehicle, and an alarm determination unit which determines whether or not to activate an alarm device based on the driving states and the traveling state. When a statistic calculated from time series data of the eye opening degree acquired from the driving state measurement unit is outside a predetermined normal determination reference range, and when it is determined that the driving states other than the eye opening degree are normal and that the traveling state is also normal, the alarm determination unit causes the driving state measurement unit to re-execute a process of detecting the eye opening degree.

When the statistic calculated from the time series data of the eye opening degree acquired from the driving state measurement unit is kept outside the predetermined normal determination reference range for a predetermined time, and when it is determined that the driving states other than the eye opening degree are normal and that the traveling state is also normal, the alarm determination unit may cause the driving state measurement unit to re-execute the process of detecting the eye opening degree.

The traveling state determination unit may include a data observation unit which observes type 1 observation data, which is a plurality of pieces of observation data constantly observed based on an in-vehicle sensor mounted on the vehicle, and type 2 observation data, which is a plurality of pieces of observation data observed at a time of operating an operation unit mounted on the vehicle by the driver, and a state determination unit which determines whether or not the traveling state is normal based on whether or not each piece of type 1 observation data is included within a normal determination reference range determined for each piece of type 1 observation data and whether or not type 2 observation data is observed.

Even when the statistic calculated from the time series data of the eye opening degree acquired from the driving state measurement unit is outside the predetermined normal determination reference range, when it is determined that the driving states other than the eye opening degree are normal and that the traveling state is also normal, the alarm determination unit may prohibit activation of the alarm device.

The vehicular monitoring device may include a coordinate detection unit which detects position information indicating a position of the vehicle and a traveling direction, and a sunshine orientation acquisition unit which acquires a sunshine orientation by referring to a sunshine orientation database that stores dates and times, the position information, and the sunshine orientations in association with each other, in which, when the statistic calculated from the time series data of the eye opening degree acquired from the driving state measurement unit is outside the predetermined normal determination reference range, the alarm determination unit may cause the driving state measurement unit to re-execute the process of detecting the eye opening degree, on condition that it is determined that the driving states other than the eye opening degree are normal and that the traveling state is also normal, and that the traveling direction of the vehicle and the sunshine orientation at the position of the vehicle satisfy a predetermined relationship.

Advantageous Effects of Invention

According to the present invention, it is possible to suppress erroneous determination regarding the driving state.

DESCRIPTION OF EMBODIMENTS

Outline of Embodiment

Figure 1:
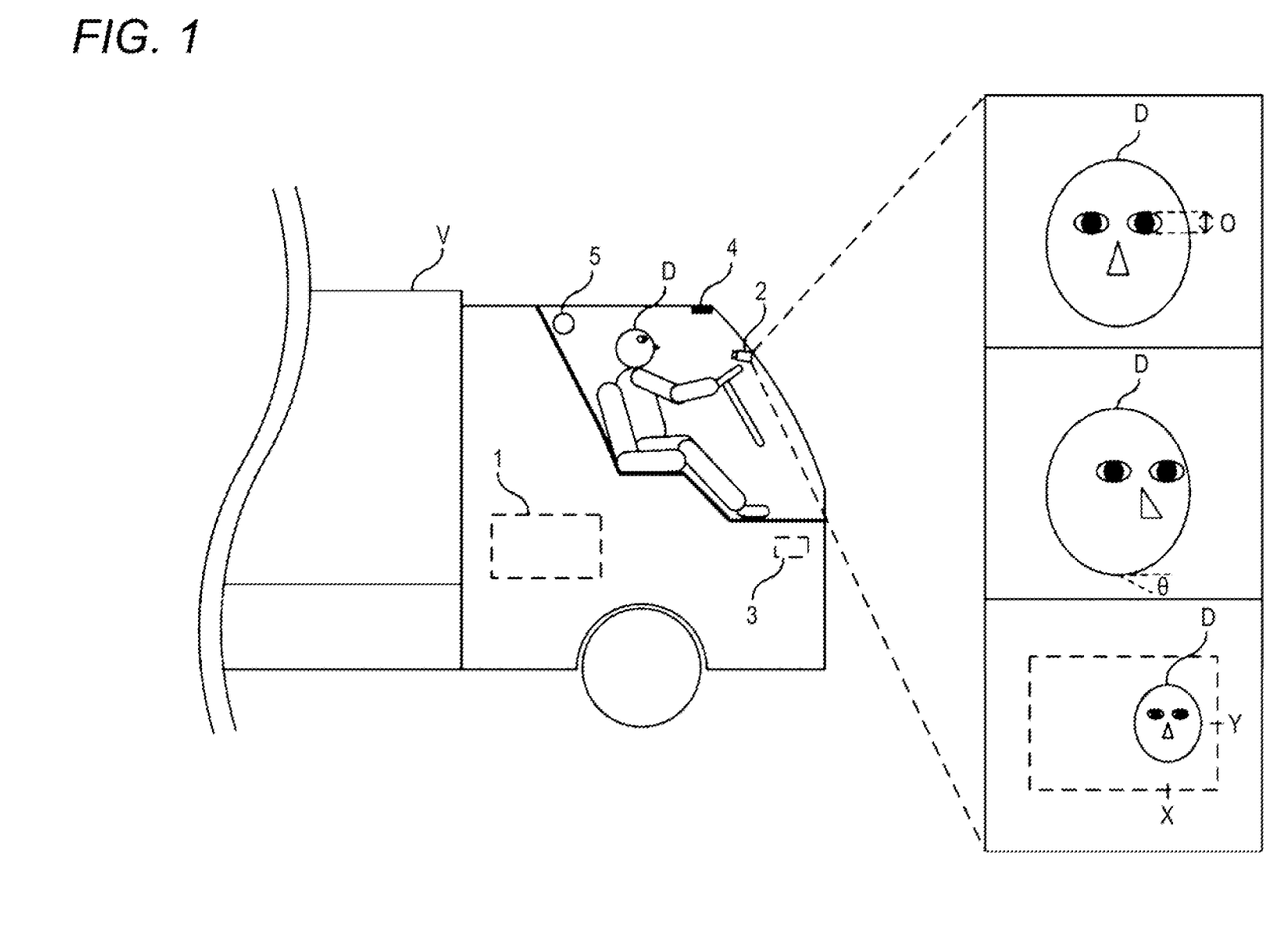
FIG. 1 is a schematic diagram for explaining an outline of a vehicular monitoring device according to an embodiment.

FIG. 1 is a schematic diagram for explaining an outline of a vehicular monitoring device 1 according to an embodiment. In the example shown in FIG. 1, the vehicular monitoring device 1 is mounted on a vehicle V driven by a driver D. The vehicle V also includes an imaging unit 2, an in-vehicle sensor 3, a GPS reception unit 4, and an alarm device 5 as a part of the vehicular monitoring device 1.

The imaging unit 2 is a solid-state image sensor such as a charge coupled device (CCD), a complementary metal oxide semiconductor (CMOS), or the like, and captures an image of the driver D of the vehicle V. The vehicular monitoring device 1 determines whether or not the driving state of the vehicle V by the driver D is appropriate, based on an eye opening degree indicating a degree of opening the eyes of the driver D, an angle of face orientation of the driver D, and a position of a face of the driver D, and the like, which are obtained by analyzing the image captured by the imaging unit 2.

In FIG. 1, the eye opening degree of the driver D is represented by O, a gaze direction of the driver D is represented by an angle θ, and the position of the face of the driver D is represented by two-dimensional coordinates (X, Y). As will be described in detail below, various information such as the eye opening degree, the angle of the face orientation, the position of the face, and the like of the driver D is analyzed by dedicated modules included in the vehicular monitoring device 1, respectively.

Here, the "driving state of the vehicle V by the driver D" means a state of the driver D indicating whether or not the driver D is capable of driving the vehicle V normally. For example, when the driver D is crouching due to heart disease, cerebral infarction, or the like so as to be incapable of driving, since the driver D cannot drive the vehicle V normally, it can be said that the driving state is "unsuitable". Further, it can also be said that it is unsuitable when the eyes of the driver D are closed.

The in-vehicle sensor 3 is various in-vehicle sensors for measuring the traveling state of the vehicle V. In this example, the "traveling state of the vehicle V" means a moving state of the vehicle V indicating whether or not the vehicle V is normally driving. The traveling state of the vehicle V is determined by the vehicular monitoring device 1 in consideration of speed and acceleration of the vehicle V, yaw rate, steering angle, operation of various pedals, operation of a wiper, operation of a direction indicator, operation of an auxiliary brake, shift operation, traveling position of the vehicle V in a road lane, distance from a preceding vehicle and the like.

The global positioning system (GPS) reception unit 4 receives GPS data from a navigation satellite. The alarm device 5 generates an alarm to call the attention of the driver.

Among the data used by the driver D to determine the driving state of the vehicle V, the eye opening degree of the driver D is one of the important data. A small eye opening degree suggests that the eyes of the driver D may be closed or may be about to close, that is, the driver D may not be awake. Therefore, the eye opening degree of the driver D is a useful clue for determining the driving state of the driver D.

Figure 2A:
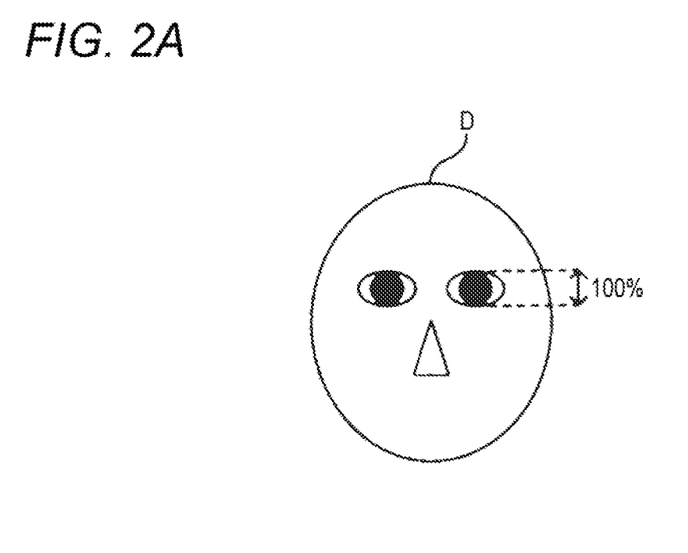
FIG. 2A is a diagram for explaining an eye opening degree of a driver measured by a vehicular monitoring device according to an embodiment.
Figure 2B:
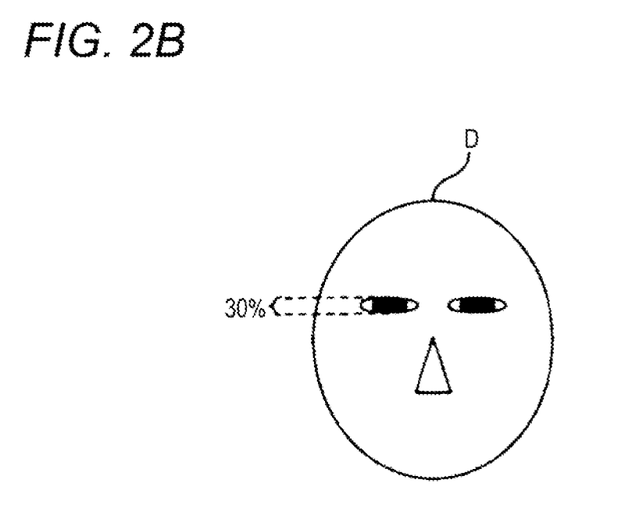
FIG. 2B is a diagram for explaining the eye opening degree of the driver measured by the vehicular monitoring device according to an embodiment.

FIGS. 2A and 2B are diagrams for explaining the eye opening degree of the driver D measured by the vehicular monitoring device 1 according to an embodiment. Specifically, FIG. 2A is a schematic view showing a face of the driver D having the eye opening degree of 100%. FIG. 2B is a schematic view showing the face of the driver D having the eye opening degree of 30%.

The eye opening degree of the driver D is defined as a ratio of an eye size of the driver D at the time of measurement relative to a normal eye size of the driver D (that is, the size of the eyes when the driver D is awake and naturally opens the eyes). Therefore, in order for the vehicular monitoring device 1 to calculate the eye opening degree of the driver D, an initialization process for determining the normal eye size of the driver D as a comparison target is necessary.

Among various modules included in the vehicular monitoring device 1, the module responsible for detecting the eye opening degree of the driver D stores a normal eye size of the driver D upon completion of the initialization process of the eye opening degree, and then detects the eye opening degree based on the stored size. For this reason, when the module responsible for detecting the eye opening degree of the driver D completes the initialization process with a size different from the original eye size of the driver D in normal times for some reason, the accuracy of the eye opening degree detected thereafter decreases.

For example, when the module responsible for detecting the eye opening degree of the driver D determines a size smaller than the original eye size, then the eye opening degree detected thereafter is output as a value larger than the original eye opening degree. On the contrary, when the module responsible for detecting the eye opening degree of the driver D determines a size larger than the original eye size, the eye opening degree detected thereafter is output as a value smaller than the original eye opening degree.

In the former case, even when the eyes of the driver D are closing, the eye opening degree detected by the vehicular monitoring device 1 remains large. As a result, even in a situation where the alarm device 5 would normally generate an alarm to call the attention of the driver, the alarm may not be generated. Further, in the latter case, even when the driver D opens his or her eyes as usual, the eye opening degree detected by the vehicular monitoring device 1 remains small. As a result, the alarm device 5 may generate an alarm to call the attention of the driver by erroneous determination.

Therefore, when a moving average of the eye opening degree, which is a statistic calculated from the time series data of the eye opening degree of the driver D, is outside a predetermined normal determination reference range, and when it is determined that the driving states other than the eye opening degree are normal and that the traveling state of the vehicle V is also normal, the vehicular monitoring device 1 according to an embodiment re-executes the process of detecting the eye opening degree. As a result, the vehicular monitoring device 1 can suppress erroneous determination regarding the driving state, and as a result, the vehicular monitoring device 1 can also suppress notification of an alarm based on the erroneous determination. As a result, it is possible to prevent the driver D from feeling unpleasant or being distrustful due to the notification of alarm based on erroneous determination.

Figure 3:
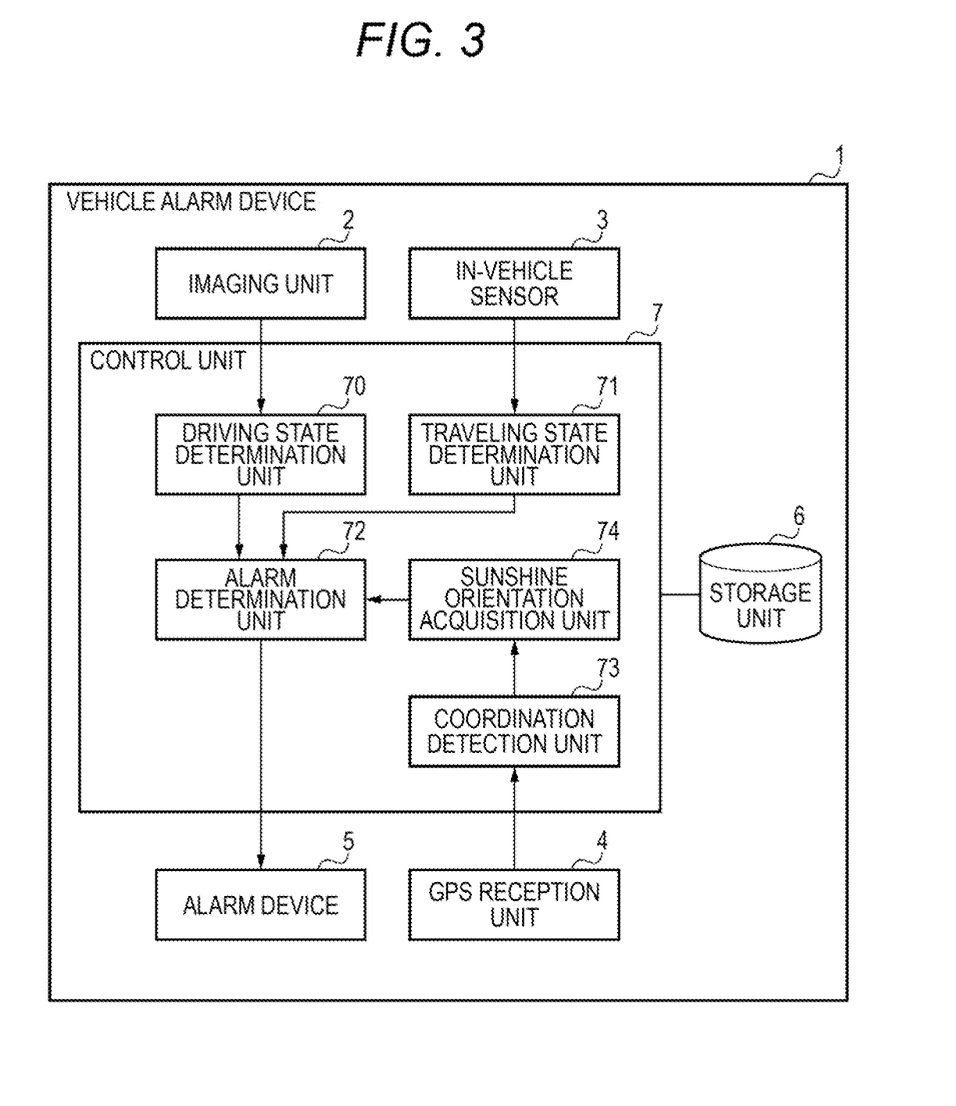
FIG. 3 is a diagram schematically showing a functional configuration of a vehicular monitoring device according to an embodiment.

Functional Configuration of Vehicular Monitoring Device 1 According to Embodiment FIG. 3 is a diagram schematically showing a functional configuration of the vehicular monitoring device 1 according to an embodiment. In addition to the imaging unit 2, the in-vehicle sensor 3, the GPS reception unit 4, and the alarm device 5 described above, the vehicular monitoring device 1 also includes a storage unit 6 and a control unit 7. In FIG. 3, the arrows indicate the main data flows, and there may be data flows not shown in FIG. 3. In FIG. 3, each functional block shows a configuration of a functional unit, rather than a configuration of a hardware (device) unit. Therefore, the functional blocks shown in the drawing may be mounted in a single device, or may be mounted separately in a plurality of devices. Transmission and reception of data between the functional blocks may be performed via any means such as a data bus, a network, a portable storage medium, or the like.

The storage unit 6 is a Read Only Memory (ROM) for storing the Basic Input Output System (BIOS) or the like of the computer that realizes the vehicular monitoring device 1, a Random Access Memory (RAM) serving as a work area for the vehicular monitoring device 1, or a large-capacity storage device such as Hard Disk Drive (HDD) or Solid State Drive (SSD) for storing Operating System (OS) or application program, or various information referenced to when the application program is executed.

The control unit 7 is a processor such as an Electronic Control Unit (ECU) or the like of the vehicle V, and serves as a driving state measurement unit 70, a traveling state determination unit 71, an alarm determination unit 72, a coordinate detection unit 73, and a sunshine orientation acquisition unit 74 by executing the programs stored in the storage unit 6.

The imaging unit 2 captures an image of the driver D of the vehicle V. Specifically, the imaging unit 2 is installed so as to be able to capture an image including a seat of the driver of the vehicle V as a subject, and generates an image such as an image of the driver D captured as the driver D gets into the vehicle V and drives the vehicle V.

The driving state measurement unit 70 analyzes the image captured by the imaging unit 2 and measures a plurality of driving states including the eye opening degree of the driver D.

Figure 4:
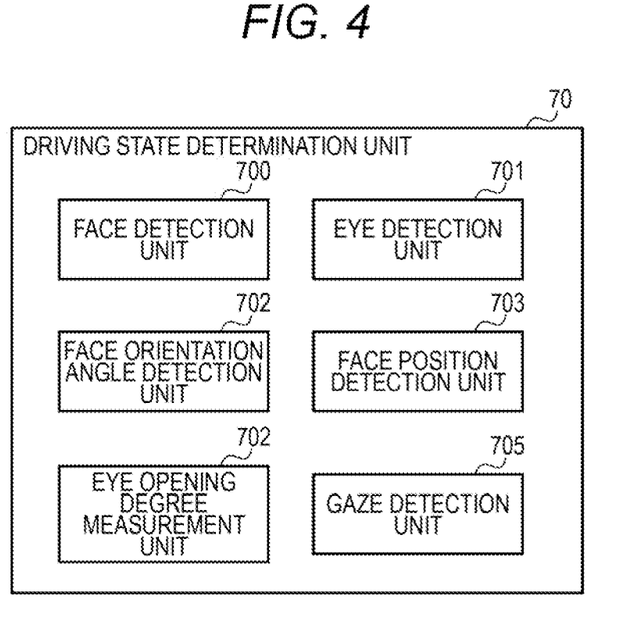
FIG. 4 is a diagram schematically showing a functional configuration of a driving state measurement unit according to an embodiment.

FIG. 4 is a diagram schematically showing a functional configuration of the driving state measurement unit 70 according to an embodiment. As shown in FIG. 4, the driving state measurement unit 70 according to the embodiment includes at least a face detection unit 700, an eye detection unit 701, a face orientation angle detection unit 702, a face position detection unit 703, an eye opening degree measurement unit 704, and a gaze detection unit 705.

The face detection unit 700, the eye detection unit 701, the face orientation angle detection unit 702, the face position detection unit 703, the eye opening degree measurement unit 704, and the gaze detection unit 705 are realized by using a known image recognition technology or image process technology, respectively. Since it is a known technique, it will not be described in detail, but the face detection unit 700 detects a face present in the image captured by the imaging unit 2. The eye detection unit 701 detects eyes present on the face detected by the face detection unit 700.

The face orientation angle detection unit 702 detects an angle indicating the orientation of the face detected by the face detection unit 700. The face position detection unit 703 detects position coordinates of a face in the two-dimensional coordinate system set in the image captured by the imaging unit 2. Note that the face position detection unit 703 may detect three-dimensional coordinates indicating a position where the face is present in the vehicle V, in a three-dimensional coordinate system having an origin at any point in the vehicle V in which the imaging unit 2 is installed.

The eye opening degree measurement unit 704 corresponds to the "module responsible for detecting the eye opening degree of the driver D" described above, and it measures the eye opening degree of the eye detected by the eye detection unit 701. The gaze detection unit 705 detects an angle indicating the gaze direction of the driver D.

Return to the description of FIG. 3. The traveling state determination unit 71 determines the traveling state of the vehicle V based on various measurement data of the in-vehicle sensor 3. The alarm determination unit 72 determines whether or not to activate the alarm device 5 based on the driving state measured by the driving state measurement unit 70 and the traveling state determined by the traveling state determination unit 71.

When the moving average of the eye opening degree, which is a statistic calculated from the time series data of the eye opening degree acquired from the driving state measurement unit 70, is outside the predetermined normal determination reference range, and when it is determined that the driving states other than the eye opening degree are normal and that the traveling state is also normal, the alarm determination unit 72 causes the driving state measurement unit 70 to re-execute the measurement of the eye opening degree. When it is determined that the driving states other than the eye opening degree are normal and that the traveling state is also normal, it is highly probable that only the eye opening degree measurement has failed. In such a case, the alarm determination unit 72 causes the driving state measurement unit 70 to initialize the eye opening degree detection and start over from the beginning. As a result, the vehicular monitoring device 1 can suppress the erroneous determination caused by the detection of the eye opening degree.

In addition, even when the moving average of the eye opening degree, which is the statistic calculated from the time series data of the eye opening degree acquired from the driving state measurement unit 70, is outside the predetermined normal determination reference range, when it is determined that the driving states other than the eye opening degree are normal and that the traveling state is also normal, the alarm determination unit 72 prohibits the activation of the alarm device. As a result, the vehicular monitoring device 1 according to the embodiment can suppress the notification of the alarm based on the erroneous determination regarding the driving state.

Figure 5A:
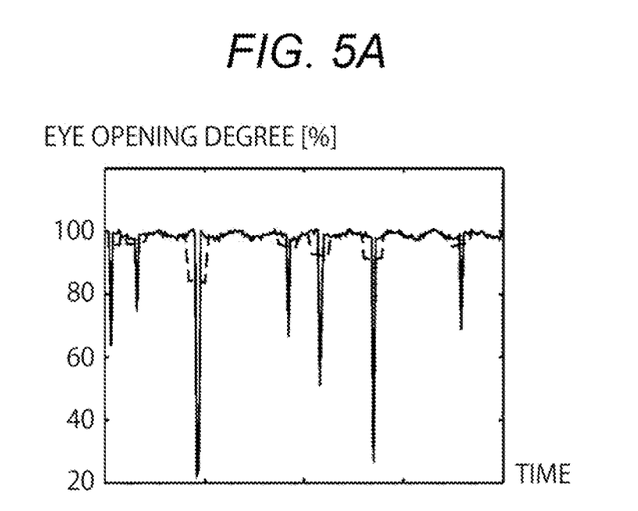
FIG. 5A is a diagram schematically showing time series data of the eye opening degree detected by an eye opening degree measurement unit according to an embodiment.
Figure 5B:
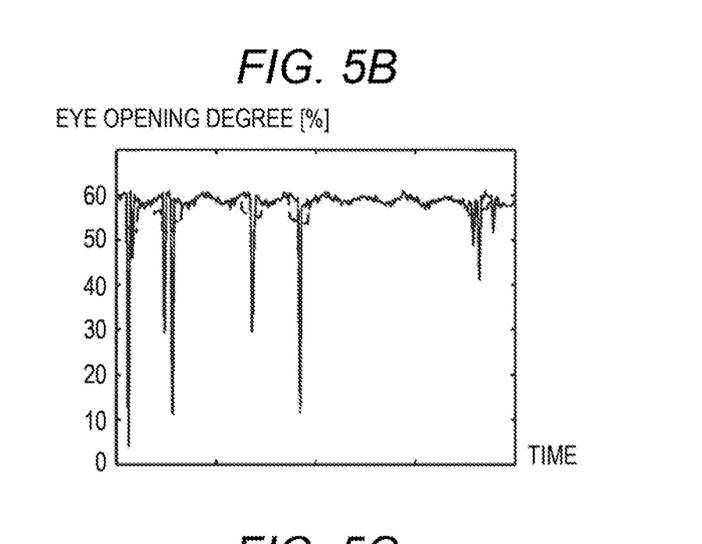
FIG. 5B is a diagram schematically showing time series data of the eye opening degree detected by the eye opening degree measurement unit according to an embodiment.
Figure 5C:
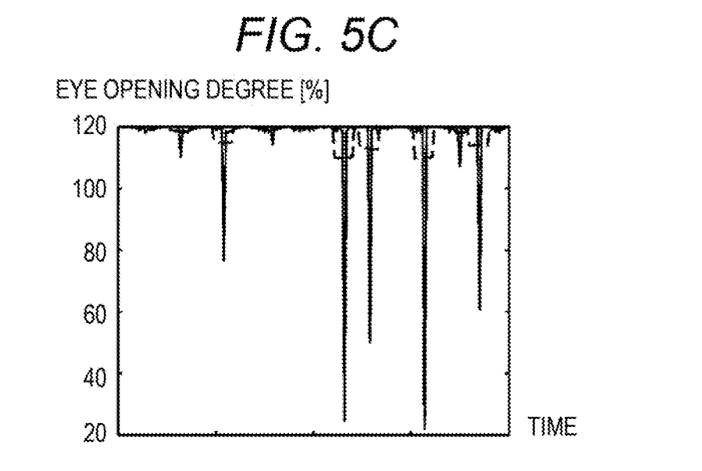
FIG. 5C is a diagram schematically showing time series data of the eye opening degree detected by the eye opening degree measurement unit according to an embodiment.

FIGS. 5A to 5C are diagrams schematically showing the time series data of the eye opening degree detected by the eye opening degree measurement unit 704 according to an embodiment. Specifically, FIG. 5A is a graph showing a temporal change of the eye opening degree when the eye opening degree measurement unit 704 can acquire the original eye size of the driver D in normal times. Meanwhile, FIG. 5B is a graph showing a temporal change of the eye opening degree when the eye opening degree measurement unit 704 determines a size larger than the original eye size of the driver D. Further, FIG. 5C is a graph showing a temporal change of the eye opening degree when the eye opening degree measurement unit 704 determines a size smaller than the original eye size of the driver D.

In FIGS. 5A to 5C, the solid lines show the changes in the eye opening degree detected by the eye opening degree measurement unit 704, and the broken lines show the moving average which is the statistic of the changes in the eye opening degree. Further, in the graphs shown in FIGS. 5A to 5C, the sharp changes in the direction in which the eye opening degree is low is due to the blink of the driver D.

In the example shown in FIG. 5A, when the eye opening degree measurement unit 704 can acquire the original eye size of the driver D in normal times, the moving average of the changes in eye opening degree is not less than 80% even when the influence of blinking of the driver D is included. Therefore, the "predetermined normal determination reference range" is set as a range within which the moving average of changes in the eye opening degree is included, when the original eye size of the driver D in normal times can be acquired. While the specific value of the predetermined normal determination reference range may be determined by experiment, it is a range of 80% or more and 110% or less, for example.

In the example shown in FIG. 5B, since the eye opening degree measurement unit 704 determines a size larger than the original eye size of the driver D, the eye opening degree hovers around 60%. When determined from the eye opening degree only, this means that the eyes of the driver D are kept half closed.

Further, in the example shown in FIG. 5C, since the eye opening degree measurement unit 704 determines a size smaller than the original eye size of the driver D, the eye opening degree is saturated at 120%, which is set as the upper limit value. This is a state in which the reliability of the eye opening degree is lost in the state other than complete eye closure (eye opening degree 0%) (that is, in the state in which the eye opening degree is greater than 0% and less than 120/6). Even when the actual eye opening degree is less than 50%, the numerical value output by the eye opening degree measurement unit 704 may be 120%, and in this case, the half-eye state cannot be detected. Note that the upper limit of the eye opening degree is an example, and may be another value as long as it exceeds 100%.

It goes without saying that the alarm device 5 should generate an alarm to call the attention of the driver D when the driver D is not completely awake and his eyes are closing due to drowsiness, for example. However, when the eye opening degree measurement unit 704 calculates a low eye opening degree due to poor initialization of the eye opening degree, the alarm device 5 should not generate an alarm. Further, in a situation where the eye opening degree is saturated, the alarm device 5 should normally generate an alarm, but the alarm is not generated.

Therefore, when the moving average, which is the statistic calculated from the time series data of the eye opening degree acquired from the driving state measurement unit 70 is outside the predetermined normal determination reference range, and when it is determined that the driving states other than the eye opening degree are normal and that the traveling state is also normal, the alarm determination unit 72 causes the driving state measurement unit 70 to re-execute the measurement of the eye opening degree. As a result, the vehicular monitoring device 1 can suppress the erroneous determination caused by the detection of the eye opening degree, and can also suppress the false alarm based on the erroneous determination.

In addition, the moving average of the eye opening degree of the driver D may be momentarily outside the normal determination reference range due to reasons, such as, when the driver D blinks a plurality of times in a short period of time or is exposed to direct sunlight and squints his eyes, for example. In such a case, when the alarm determination unit 72 immediately causes the driving state measurement unit 70 to re-execute the measurement of the eye opening degree, it is possible to acquire the original eye size of driver D in normal times, but the initialization process of the eye opening degree measurement may have to be redone.

Therefore, as a condition for causing the driving state measurement unit 70 to re-execute the process of detecting the eye opening degree, the alarm determination unit 72 may add that the moving average calculated from the time series data of the eye opening degree acquired from the driving state measurement unit 70 is kept outside the predetermined normal determination reference range for a predetermined time. Specifically, when the statistic calculated from the time series data of the eye opening degree acquired from the driving state measurement unit 70 is kept outside the predetermined normal determination reference range for a predetermined time, and when it is determined that the driving states other than the eye opening degree are normal and that the traveling state is also normal, the alarm determination unit 72 causes the driving state measurement unit 70 to re-execute the process of detecting the eye opening degree.

In this example, the "predetermined time" is a "threshold time for re-execution of eye opening degree determination" that is referenced by the alarm determination unit 72 in order to determine whether or not to cause the driving state measurement unit 70 to re-execute the detection of the eye opening degree. While a specific value of the predetermined time may be preferably determined by an experiment in consideration of the balance between the accuracy of eye opening degree detection and the notification of the alarm for ensuring safety, it is five seconds, for example. As described above, when applying the state in which the statistic calculated from the time series data of the eye opening degree is kept outside the predetermined normal determination reference range for the predetermined time as the condition for re-executing the detection process of the eye opening degree, the vehicular monitoring device 1 can suppress the re-execution of unnecessary initialization process of eye opening degree measurement.

Figure 6:
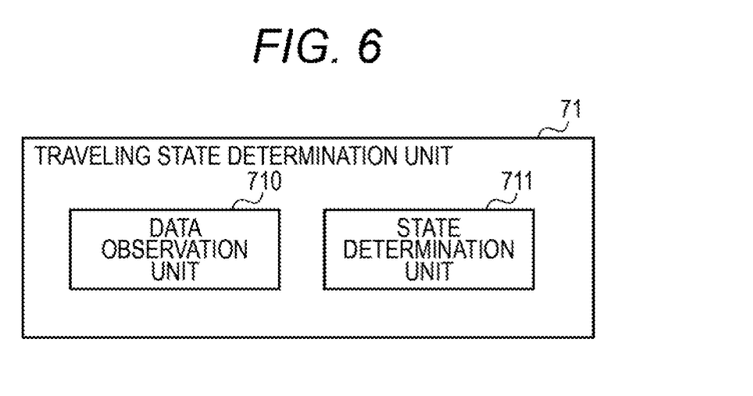
FIG. 6 is a diagram schematically showing a functional configuration of a traveling state determination unit according to an embodiment.

FIG. 6 is a diagram schematically showing a functional configuration of the traveling state determination unit 71 according to an embodiment. As shown in FIG. 6, the traveling state determination unit 71 according to the embodiment includes at least a data observation unit 710 and a state determination unit 711.

The data observation unit 710 observes type 1 observation data, which is a plurality of pieces of observation data constantly observed based on the in-vehicle sensor 3 mounted on the vehicle V. The data observation unit 710 also observes type 2 observation data, which is a plurality of pieces of observation data observed at a time of operating an operation unit mounted on the vehicle V by the driver D.

For example, type 1 observation data observed by the data observation unit 710 is an amount of change in a position in a road lane while the vehicle V is traveling in the road lane, an amount of change in a vehicle speed of the vehicle V, an amount of change in a steering angle, an amount of change in a yaw rate, an amount of change in an inter-vehicle distance, and the like. It can also be said that type 1 observation data is data that is constantly observed.

In general, when the driver D is driving the vehicle V normally, it is considered that all of type 1 observation data described above have smaller values than the case where the driver D is driving abnormally, such as dozing driving, inattentive driving, and the like. Therefore, the state determination unit 711 uses whether or not each type 1 observation data is included within the normal determination reference range determined for each type 1 observation data, as one determination reference for determining whether or not the traveling state is normal.

As used herein, the "normal determination reference range" is the range in which each type 1 observation data by the data observation unit 710 is included when the traveling state of the vehicle V is normal. The normal determination reference range of each type 1 observation data may be preferably determined by an experiment in consideration of the size of the vehicle V, the engine performance, the vehicle type, and the like.

Examples of type 2 observation data observed by the data observation unit 710 include presence and absence of pedal operation such as an accelerator pedal, a brake pedal, a clutch pedal, and the like, presence and absence of an operation of a direction indicator, presence and absence of a shift operation, and the like. It can also be said that type 2 observation data is data that is observed intermittently.

In general, when the driver D is driving the vehicle V normally, it is considered that there is a higher probability that type 2 observation data is observed than when the driver D is driving abnormally such as dozing driving or inattentive driving. This is because the pedal operation, the operation of the direction indicator, and the like are unlikely to occur unless the driver D intentionally performs the operation. When type 2 observation data is observed, it is considered that the driver D is normal and the vehicle V is traveling normally at least until the predetermined period elapses.

Therefore, the state determination unit 711 also uses whether or not type 2 observation data is observed, as another determination reference for determining whether or not the traveling state is normal. More specifically, the state determination unit 711 determines that the traveling state of the vehicle V is normal until the predetermined period elapses after the time when type 2 observation data is observed.

In this example, the "predetermined period" is a period used by the data observation unit 710 to determine the traveling state when type 2 observation data is observed. When the predetermined period elapses after certain type 2 observation data is observed, the data observation unit 710 stops determining the traveling state based on type 2 observation data. The specific value of the "predetermined period" may be preferably determined by an experiment in consideration of the driving pattern of the driver D or the like.

As described above, the traveling state determination unit 71 can accurately estimate the traveling state of the vehicle V based on the measurement data of the in-vehicle sensor 3 included in the vehicle V and the operation by the driver D.

Return to the description of FIG. 3. The driving state measurement unit 70 measures the driving state of the driver D using known image recognition technology and image process technology based on the image captured by the imaging unit 2. Therefore, when the quality of the image used by the driving state measurement unit 70 for measuring the driving state is low, the accuracy of measuring the driving state may be lower than when the quality is high.

Various factors can be considered as the ones to deteriorate the quality of the image, but in particular, when the pixel value of the image generated by the imaging unit 2 is saturated due to strong light reflected on the face of the driver D. or when a large shadow appears on the face of the driver D, the recognition accuracy of each of the units included in the driving state measurement unit 70 is likely to decrease.

As one of the typical situations where the face of driver D is exposed to strong light, there is a situation where the face of driver D is exposed to afternoon sun. This is because the afternoon sun has a shallow incident angle and is easy to reach the driver D without being blocked by the vehicle V. While it is considered that the morning sun immediately after sunrise has also the shallow angle of incidence, since the time zone when the afternoon sun appears is more likely to overlap with the time when the driver D is active than the time zone immediately after sunrise, it is considered that the afternoon sun has a great influence on the quality of the image generated by the imaging unit 2.

Therefore, the coordinate detection unit 73 detects the position information indicating the position of the vehicle V and the traveling direction based on the GPS data received by the GPS reception unit 4. The sunshine orientation acquisition unit 74 acquires a sunshine orientation by referring to a sunshine orientation database that stores dates and times, position information, and sunshine orientations in association with each other.

Figure 7:
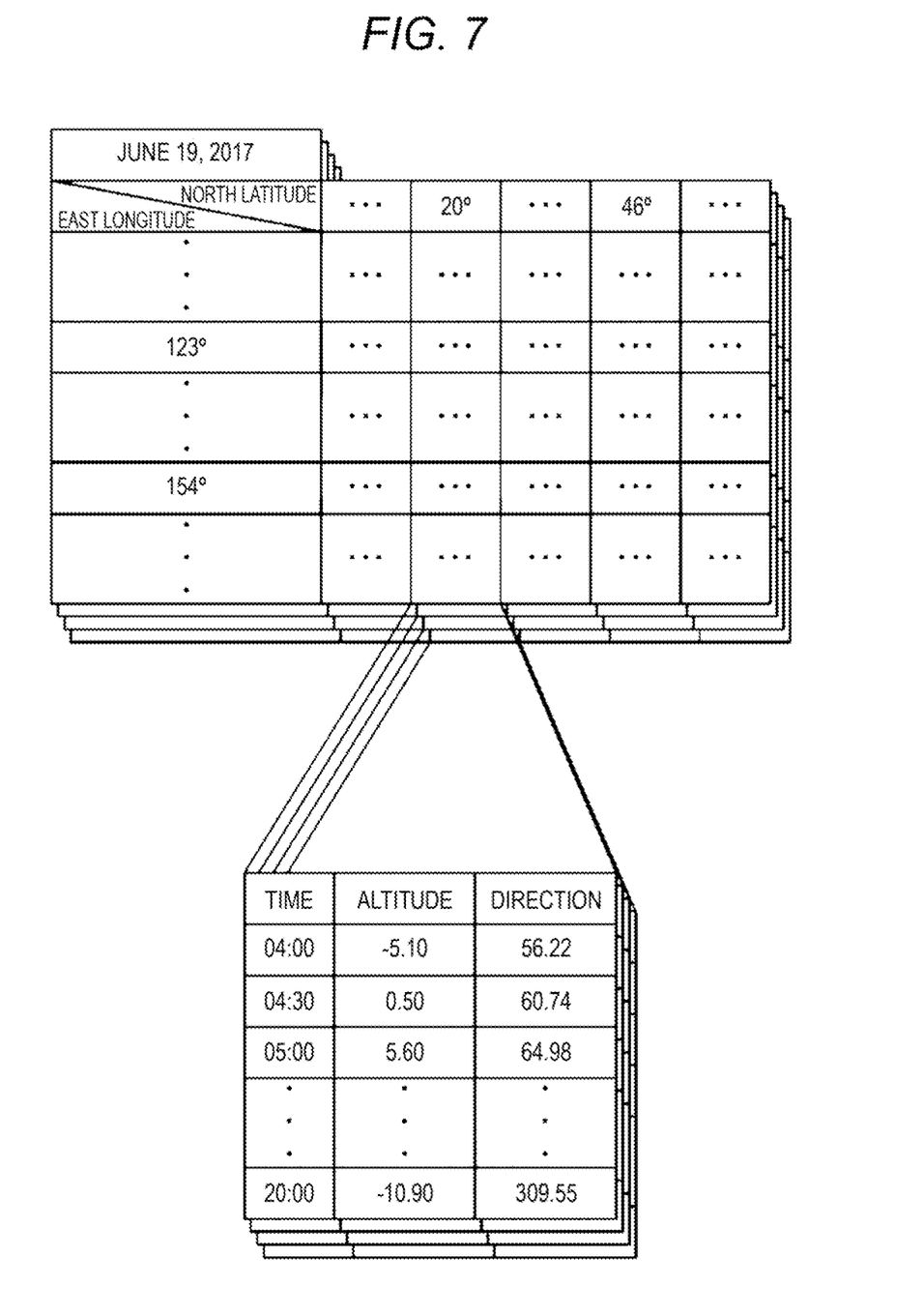
FIG. 7 is a diagram schematically showing a data structure of a sunshine orientation database according to an embodiment.

FIG. 7 is a diagram schematically showing a data structure of the sunshine orientation database according to an embodiment. The sunshine orientation database is stored in the storage unit 6 and managed by the sunshine orientation acquisition unit 74. As shown in FIG. 7, the sunshine orientation database collects the data of the sunshine orientations into units of dates. In the example shown in FIG. 7, the data of the sunshine orientation on Jun. 19, 2017 is shown.

More specifically, the sunshine orientation database collects the altitude and orientation of the sun for each combination of latitude and longitude on each date. The sunshine orientation acquisition unit 74 can designate the date, the latitude, and the longitude and acquire the altitude and orientation of the sun in every 30 minutes, for example, by referring to the sunshine orientation database.

When the statistic calculated from the time series data of the eye opening degree acquired from the driving state measurement unit 70 is outside the predetermined normal determination reference range, the alarm determination unit 72 causes the driving state measurement unit 70 to re-execute the process of detecting the eye opening degree, on condition that it is determined that the driving states other than the eye opening degree are normal and that the traveling state is also normal, and that the traveling direction of the vehicle V and the sunshine orientation at the position of the vehicle V satisfy a predetermined relationship.

As an example of a predetermined condition, the alarm determination unit 72 may use a condition that the traveling direction of the vehicle V is a direction facing the sunshine orientation. This is because when the traveling direction of the vehicle V is a direction facing the sunshine orientation, there is a high possibility that the face of the driver D is exposed to direct sunlight, which may affect the determination of the driving state of the driver D by the driving state measurement unit 70. As a result, the vehicular monitoring device 1 according to the embodiment can suppress erroneous determination regarding the driving state, and as a result, the vehicular monitoring device 1 can also suppress notification of an alarm based on the erroneous determination.

Process Flow of Driver D Monitoring Process Executed by Vehicular Monitoring Device 1

Figure 8:
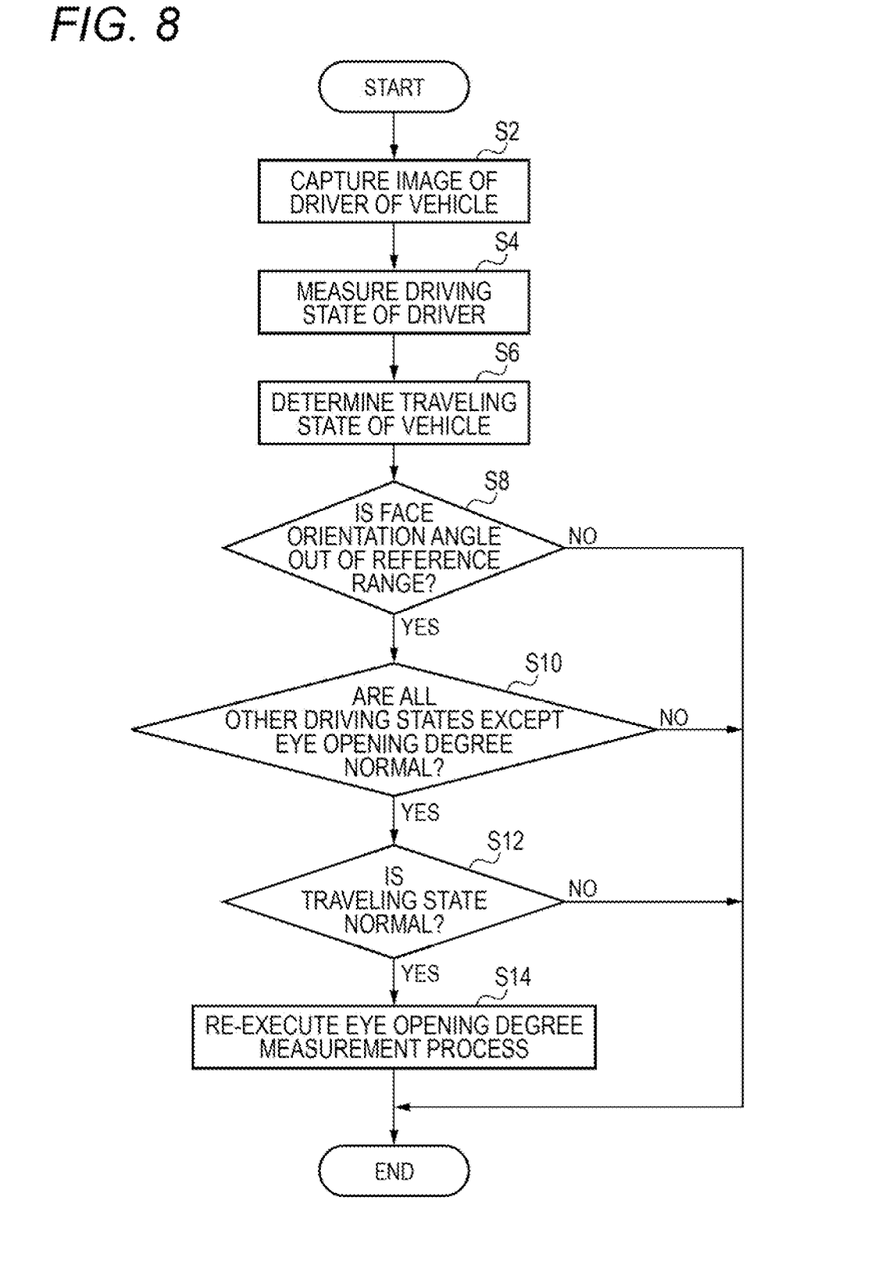
FIG. 8 is a flowchart for explaining a flow of driver monitoring process executed by the vehicular monitoring device according to an embodiment.

FIG. 8 is a flowchart for explaining a flow of a driver D monitoring process executed by the vehicular monitoring device 1 according to an embodiment. The process in this flowchart starts when the vehicular monitoring device 1 is activated, for example.

The imaging unit 2 captures an image of the driver D of the vehicle V (S2). The driving state measurement unit 70 analyzes the image captured by the imaging unit 2 and measures a plurality of driving states including the eye opening degree of the driver D (S4). The traveling state determination unit 71 determines the traveling state of the vehicle V based on various measurement data of the in-vehicle sensor 3 (S6).

When the statistic calculated from the time series data of the eye opening degree is outside the predetermined normal determination reference range (Yes in S8), and when all driving states other than the eye opening degree are normal (Yes in S10) and that the traveling state is also normal (Yes in S12), the alarm determination unit 72 causes the driving state measurement unit 70 to re-execute the measurement of the eye opening degree (S14).

When the driving state measurement unit 70 is caused to re-execute the measurement of the eye opening degree, and when the statistic calculated from the time series data of the eye opening degree is within a predetermined normal determination reference range (No in S8), and when at least one of the driving states other than the eye opening degree is abnormal (No in S10), or when the traveling state is abnormal (No in S12), the process in this flowchart is terminated.

Effects of Vehicular Monitoring Device 1 According to Embodiment

As described above, with the vehicular monitoring device 1 according to the embodiment, it is possible to suppress erroneous determination regarding the driving state.

Although the present invention has been described above using the embodiments, the technical scope of the present invention is not limited to the scope described in the above embodiments, and various modifications and changes can be made within the scope of the gist thereof. For example, the specific embodiment of the distribution or integration of the devices is not limited to the embodiments described above, and all or a part thereof can be functionally or physically distributed or integrated in any unit. Further, new embodiments resulting from any combination of the plurality of embodiments are also included in the embodiments of the present invention. The effect of the new embodiments produced by the combination has the effect of the original embodiment together.

Modification Example

In the above, as an example of type 1 observation data that can be constantly observed, the amount of change in a position in the road lane while the vehicle V is traveling in the road lane, the amount of change in the vehicle speed of the vehicle V, the amount of change in the steering angle, the amount of change in the yaw rate, the amount of change in the inter-vehicle distance, and the like have been described. More specifically, the example has been described, in which whether or not each type 1 observation data is included within the normal determination reference range determined for each type 1 observation data, is used as one determination reference for determining whether or not the traveling state is normal.

Here, the amount of change of the vehicle speed of the vehicle V, the amount of change of the steering angle, the amount of change of the yaw rate, the amount of change of the inter-vehicle distance, and the like can be adopted as type 2 observation data to be observed intermittently. In addition to the normal determination reference ranges defined for each type 1 observation data, an intermittent event observation reference range for detecting a change greater than the normal determination reference range is provided. For example, when the driver D of the vehicle V changes road lanes or increases the vehicle speed for overtaking, large changes are observed in the vehicle speed, the steering angle, the yaw rate, and the inter-vehicle distance of the vehicle V. In such a case, since it is considered that the driver D is driving the vehicle V normally, it can be adopted as a determination material for determining whether or not the traveling state is normal.

This application is based on Japanese Patent Application filed on Sep. 20, 2018 (Japanese Patent Application No. 2018-176321), the contents of which are incorporated herein by reference.

INDUSTRIAL APPLICABILITY

The vehicular monitoring device 1 according to the present disclosure can suppress erroneous determination regarding the driving state, and as a result, the vehicular monitoring device 1 can also suppress notification of an alarm based on the erroneous determination. Then, it is possible to prevent the driver D from feeling unpleasant or being distrustful due to the notification of alarm based on erroneous determination.

REFERENCE SIGNS LIST

1: vehicular monitoring device
2: imaging unit
3: in-vehicle sensor
4: GPS reception unit
5: alarm device
6: storage unit
7: control unit
70: driving state measurement unit
700: face detection unit
701: eye detection unit
702: face orientation angle detection unit
703: face position detection unit
704: eye opening degree measurement unit 705: gaze detection unit
71: traveling state determination unit
710: data observation unit
711: state determination unit
72: alarm determination unit
73: coordinate detection unit
74: sunshine orientation acquisition unit
V: vehicle

The invention claimed is:

1. A vehicular monitoring device comprising:
an imaging unit which captures an image of a driver of a vehicle;
a driving state measurement unit which analyzes the image captured by the imaging unit and measures a plurality of driving states including an eye opening degree of the driver;
a traveling state determination unit which determines a traveling state of the vehicle; and
an alarm determination unit which determines whether or not to activate an alarm device based on the driving states and the traveling state,
wherein, when a statistic calculated from time series data of the eye opening degree acquired from the driving state measurement unit is outside a predetermined normal determination reference range, and when is determined that the driving states other than the eye opening degree are normal and that the traveling state is also normal, the alarm determination unit causes the driving state measurement unit to re-execute a process of detecting the eye opening degree without activating the alarm device.

2. The vehicular monitoring device according to claim 1, wherein, when the statistic calculated from the time series data of the eye opening degree acquired from the driving state measurement unit is kept outside the predetermined normal determination reference range for a predetermined time, and when is determined that the driving states other than the eye opening degree are normal and that the traveling state is also normal, the alarm determination unit causes the driving state measurement unit to re-execute the process of detecting the eye opening degree.

3. The vehicular monitoring device according to claim 1, wherein the traveling state determination unit includes:
a data observation unit which observes type 1 observation data, which is a plurality of pieces of observation data constantly observed based on an in-vehicle sensor mounted on the vehicle, and type 2 observation data, which is a plurality of pieces of observation data observed at a time of operating an operation unit mounted on the vehicle by the driver; and
a state determination unit which determines whether or not the traveling state is normal based on whether or not each piece of type 1 observation data is included within a normal determination reference range determined for each piece of type 1 observation data and whether or not type 2 observation data is observed.

4. The vehicular monitoring device according to claim 1, wherein, even when the statistic calculated from the time series data of the eye opening degree acquired from the driving state measurement unit is outside the predetermined normal determination reference range, when is determined that the driving states other than the eye opening degree are normal and that the traveling state is also normal, the alarm determination unit prohibits activation of the alarm device.

5. The vehicular monitoring device according to claim 1, further comprising:
a coordinate detection unit which detects position information indicating a position of the vehicle and a traveling direction; and
a sunshine orientation acquisition unit which acquires a sunshine orientation by referring to a sunshine orientation database that stores dates and times, the position information, and sunshine orientations in association with each other,
wherein, when the statistic calculated from the time series data of the eye opening degree acquired from the driving state measurement unit is outside the predetermined normal determination reference range, the alarm determination unit causes the driving state measurement unit to re-execute the process of detecting the eye opening degree, on condition that is determined that the driving states other than the eye opening degree are normal and that the traveling state is also normal, and that the traveling direction of the vehicle and the sunshine orientation at the position of the vehicle satisfy a predetermined relationship.

6. The vehicular monitoring device according to claim 1, wherein, when the statistic is outside the predetermined normal determination reference range, after is determined that the driving states other than the eye opening degree are abnormal and that the traveling state is abnormal, the alarm determination unit activates the alarm device.

7. The vehicular monitoring device according to claim 1, wherein, when the statistic is outside the predetermined normal determination reference range, only after is determined that the driving states other than the eye opening degree are abnormal and that the traveling state is abnormal, the alarm determination unit activates the alarm device.

* * * * *